United States Patent [19]
Dean

[11] 4,331,291
[45] May 25, 1982

[54] PNEUMATIC CONTROL CIRCUIT FOR AIR DISTRIBUTION SYSTEMS

[75] Inventor: Raymond H. Dean, Johnson County, Kans.

[73] Assignee: Tempmaster Corporation, Kansas City, Mo.

[21] Appl. No.: 196,668

[22] Filed: Oct. 14, 1980

[51] Int. Cl.³ .............................................. F24F 7/04
[52] U.S. Cl. ................................... 236/49; 236/80 R
[58] Field of Search ......................... 236/49, 85, 80 R; 137/84

[56] References Cited

U.S. PATENT DOCUMENTS

| | | | |
|---|---|---|---|
| 3,719,321 | 3/1973 | McNabney | 236/49 |
| 3,796,367 | 3/1974 | Rifkin . | |
| 3,806,027 | 4/1974 | Ginn et al. | 137/84 X |
| 3,941,310 | 3/1976 | Travaglio et al. | 236/49 |
| 3,967,780 | 6/1976 | Traver . | |
| 4,014,381 | 3/1977 | Clark . | |
| 4,042,173 | 8/1977 | Boyer et al. | 236/49 |
| 4,077,310 | 2/1978 | McCabe, Jr. et al. . | |
| 4,147,298 | 4/1979 | Leemhus | 236/49 |
| 4,189,092 | 2/1980 | Maxson et al. | 236/49 X |
| 4,231,515 | 11/1980 | Ring, Jr. | 236/80 R X |
| 4,264,035 | 4/1981 | Maxson et al. | 236/49 X |

Primary Examiner—William E. Tapolcai, Jr.
Attorney, Agent, or Firm—Kokjer, Kircher, Bradley, Wharton, Bowman & Johnson

[57] ABSTRACT

A pneumatic control circuit for controlling the discharge of conditioned air from an air distribution system. The circuit is arranged to apply the supply pressure to an inflatable bladder which controls the discharge of conditioned air from a ventilation duct. A diaphragm controls the bleeding of air from the bladder under the influence of the supply pressure, a thermostat, a velocity sensor at the duct outlet and a plurality of selectively sized orifices. The velocity sensor compensates automatically for variations in the main supply pressure so that the control function of the circuit is independent of the supply pressure.

11 Claims, 2 Drawing Figures

PNEUMATIC CONTROL CIRCUIT FOR AIR DISTRIBUTION SYSTEMS

BACKGROUND AND SUMMARY OF THE INVENTION

This invention relates in general to the distribution of conditioned air and more particularly to a pneumatic circuit which acts to control the discharge of conditioned air from ventilating ducts.

The heating and cooling of relatively large buildings such as office buildings is normally accomplished by passing conditioned air through ventilating ducts which direct the conditioned air to separate rooms of the building. Individual temperature control for the separate offices or other sections of the building is achieved by controlling the volume of air flow through the duct or through the air outlet which discharges the conditioned air from the duct into the room. Typically, a flow control device is provided in the duct or outlet to regulate the flow of conditioned air to an air diffuser or similar outlet device, thereby controlling the room temperature. This type of air distribution system is generally high in efficiency and low in cost since it utilizes a single large heating or cooling unit to supply several rooms or floors of the building. At the same time, there is no sacrifice in the individual temperature control for each office.

Despite its generally satisfactory performance, this type of air distribution system has not been entirely free of problems. For example, it has proven difficult to achieve accurate and repeatable control of the flow control device, and the temperature control of individual rooms has suffered accordingly. One of the main problems with this kind of air distribution system is that the flow from the outlets varies at least to some extent with the main supply pressure of the conditioned air. Thus, if the supply pressure increases, the air flow increases even though there is no increase in the demand for conditioned air.

Existing control systems devised to minimize this variation with supply pressure are characterized by excessive cost and complexity, due in large part to the need for a number of complicated components such as multiple diaphragms, associated springs, and the like. It is usually necessary, for control purposes, to provide a high velocity pressure or pressure differential on the high pressure side of the flow control device. This increases the need for pressure control components and adds to the fan requirements, thus contributing significantly to the high equipment and operating costs of the system.

The present invention is aimed at eliminating these problems and has, as its principal object, the provision of a pressure independent control circuit for controlling the discharge of conditioned air in an air distribution system. It is a particularly important feature of the invention that, for a given position of the thermostat, the air flow is determined by the pressure which is fed back from a velocity sensor located on the low pressure side of the duct outlet. The feedback signals from a velocity sensor thus automatically compensate for variations in the main supply pressure, and the control function of the circuit is not effected by pressure changes in the ventilation ducts.

It is another important object of the invention to provide a pneumatic control circuit which is simple and economical to construct and reliable in operation. Since only a single diaphragm is required to achieve pressure independent control, the costs are reduced as compared to control systems requiring numerous diaphragms and other pressure sensitive components.

A still further object of the invention is to provide a pneumatic control circuit of the character described which achieves accurate flow control without the need for a pressure differential on the high pressure side of the duct outlet. In the present invention, the pressure drop across the outlet is adequate for control purposes, and since this pressure drop is present in any event to assure effective air distribution, there is no need for the addition of a separate pressure or pressure differential for purposes of control. As a result, the complexity of the system and the fan requirements are reduced.

Yet another object of the invention is to provide, in a pneumatic control circuit of the character described, a plurality of strategically located and selectively sized orifices which assist in attaining the desired pressure and avoiding excessive pressure fluctuations.

An additional object of the invention is to provide, in a pneumatic control circuit of the character described, a pneumatic relay device which achieves both flow gain and pressure gain. A small orifice remote thermostat can thus control a relatively high flow rate to and from the bladder so that the control circuit responds quickly to changes in the demand for conditioned air. Also, a number of units operating at widely different supply pressures can be controlled by a single thermostat.

Another object of the invention is to provide a control which can be interlocked to a separate air system such that the controlled air system's flow varies inversely.

Other and further objects of the invention, together with the features of novelty appurtenant thereto, will appear in the course of the following description.

DETAILED DESCRIPTION OF THE INVENTION

Figure 1:
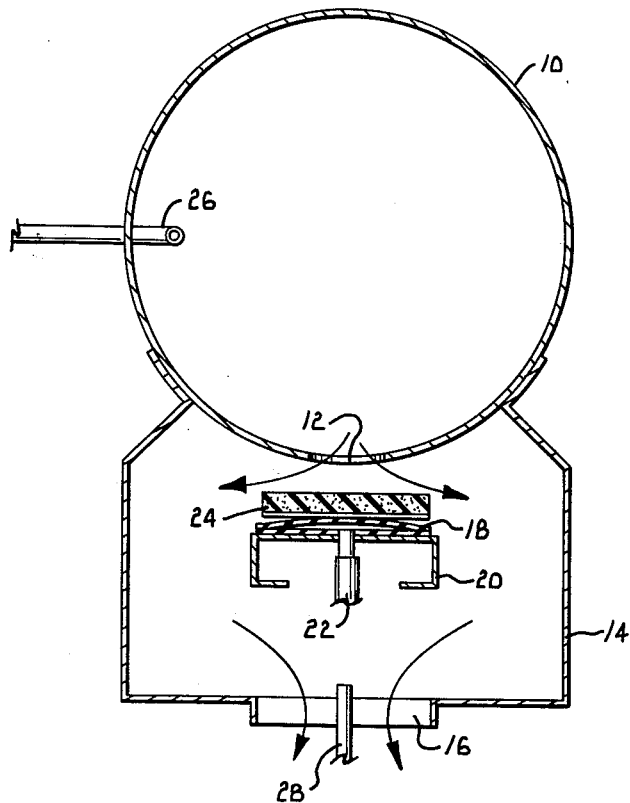
Figure 2:
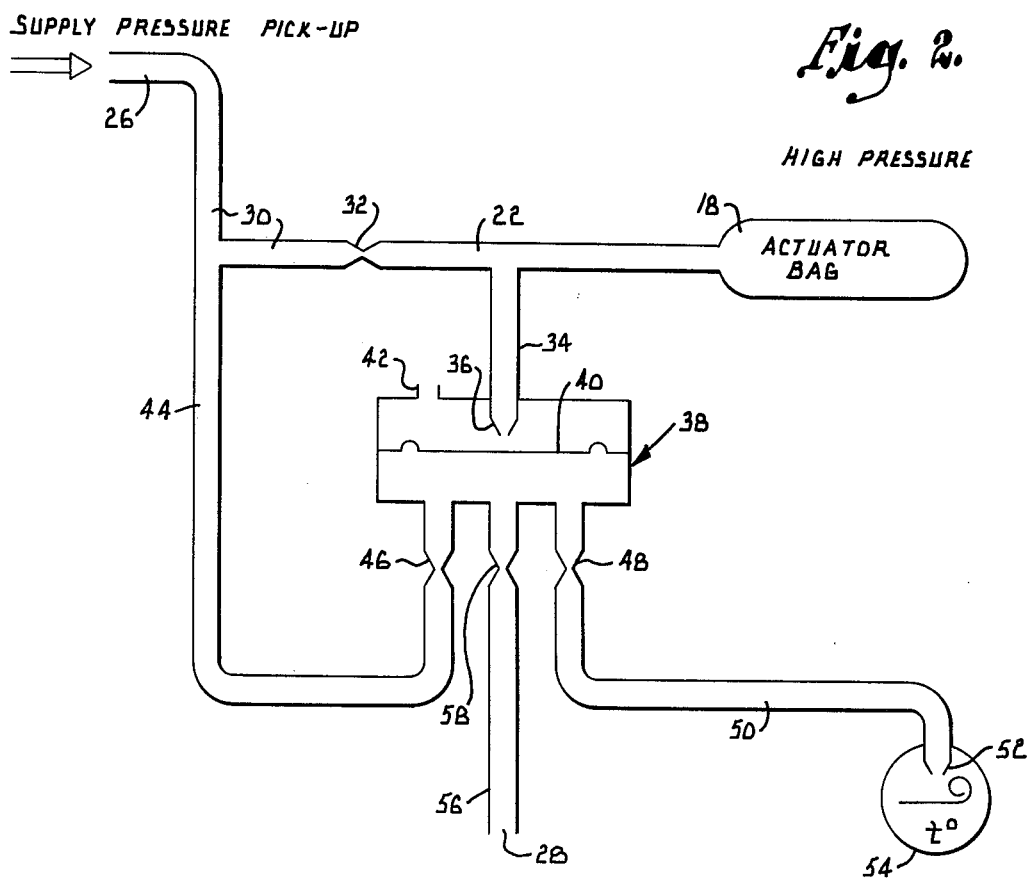

In the accompanying drawings which form a part of the specification and are to be read in conjunction therewith and in which like reference numerals are used to:

FIG. 1 is a sectional view taken on a vertical plane through a ventilation duct and air diffuser forming part of an air distribution system which is equipped with a pneumatic control system constructed according to a preferred embodiment of the present invention; and FIG. 2 is a schematic diagram of the pneumatic control circuit.

Referring initially to FIG. 1, numeral 10 identifies a cylindrical duct which receives conditioned air from a suitable heating or cooling unit (not shown). The conditioned air is supplied to duct 10 at a relatively high supply pressure and is discharged from the duct at a relatively low pressure through an elongate outlet slot 12 formed in the bottom of the duct. Air diffuser 14 receives the air discharge through slot 12 and distributes the air to a room or other area which is to be heated or cooled. The air is directed into the room through a slot 16 in the bottom of the air diffuser.

The flow of conditioned air through slot 12 is controlled by an inflatable air bag or bladder 18 which is shown in the fully deflated condition in FIG. 1. Bladder 18 is supported on top of a metal pan 20 located within the diffuser structure 14. Air for inflation of bladder 18 is supplied thereto by a conduit 22. A foam pad 24 is disposed above bladder 18 and is moved toward and away from slot 12 upon inflation and deflation of the bladder. When the bladder is fully inflated, pad 24 seals slot 12 to prevent discharge of air therefrom. In the fully deflated condition of the bladder shown in FIG. 1, pad 24 is located well below slot 12 to permit the conditioned air to flow essentially freely out of the slot and into the room.

In accordance with the present invention, a supply pressure pickup fitting 26 picks up the main supply pressure of the conditioned air in duct 10. Fitting 26 is in the form of an open ended tube having its open end facing in a direction to receive the air which is forced through duct 10 by a fan (not shown). A flow sensor 28 is located adjacent slot 16 on the low pressure side of bladder 18 in order to sense the quantity of the air discharged through slot 12. The flow sensor 28 may take the form of an open ended tube having its open end facing upwardly within the diffuser structure 14 and below slot 12, or a long perforated manifold. The pressure in the flow sensor is determined primarily by the pressure drop across the diffuser which directs air into the room.

Referring now more particularly to the pneumatic control circuit shown in FIG. 2, the supply pressure pickup fitting 26 connects with a conduit 30 having a T-connection with the conduit 22 which supplies the actuator bag or bladder 18. The conduit 30 is provided with an orifice 32 having a diameter of approximately 0.045" in a preferred form of the invention. An exhaust line 34 serves to bleed pressure from bladder 18 in order to effect deflation of the bladder and increased flow through slot 12. The exhaust line 34 connects at a right angle with conduit 22. Line 34 terminates in a control orifice 36 which is located within the casing of an amplifying relay generally indicated at 38. Orifice 36 is located centrally above a flexible diaphragm 40 mounted within the casing of the relay. The upper side of diaphragm 40 is vented to atmosphere through a vent opening 42, and the pressure above diaphragm 40 is thus atmospheric except for the small area of orifice 36. It is to be noted that when diaphragm 40 is displaced upwardly, it closes off the control orifice 36 to prevent bleeding of pressure from bladder 18. The weight of the diaphragm, in cooperation with a spring (not shown) if desired, urges the diaphragm downwardly toward the open position.

As suggested above, conduit 30 has a T-connection with another conduit 44 which extends into the bottom of relay 38 to communicate with the under side of diaphragm 40. Conduit 44 has an orifice 46 which is located between conduit 30 and the underside of the diaphragm and has a diameter of approximately 0.007" in a preferred form of the invention. In actual practice, conduit 44 essentially forms a continuation of conduit 30 for applying the supply pressure, through orifice 46 to the underside of diaphragm 40.

Extending from the underside of the diaphragm 40 is a short conduit 50 providing with a limiting orifice 48 and a terminating orifice 52. Orifice 48 has a diameter of approximately 0.020". A conventional thermostat 54 controls the flow through orifice 52. Thermostat 54 is located in the room that is to be heated or cooled and responds to temperature changes in a manner to open and close orifice 52. For example, if the air distribution system is operating in a cooling mode, thermostat 54 is set to open orifice 52 to an equivalent diameter much larger than that of orifice 48 when the temperature in the room exceeds the temperature level set on the thermostat. When the room temperature is below the setting of the thermostat, orifice 52 is closed.

The velocity sensor 28 connects with a conduit 56 which leads through an orifice 58 to the underside of diaphragm 40. The relatively low pressure at the velocity sensor is thus transmitted through orifice 58 and is applied against the underside of diaphragm 40 along with the pressure transmitted through orifice 46. In a preferred embodiment of the invention, orifice 58 has a diameter of approximately 0.010". The size of orifice 58 is thus considerable less than that of orifice 48 but is greater than that of orifice 46.

In operation, the pneumatic circuit controls the extent to which bladder 18 is inflated and thus controls the flow of conditioned air into the room that is being heated or cooled. If the air distribution system is operating in the cooling mode and the room temperature is at or below the setting of thermostat 54, the thermostat is closed. The supply pressure is then transmitted through conduits 30 and 44 (and through orifice 46) to the underside of diaphragm 40, thereby forcing the diaphragm upwardly to close orifice 36. Since this closes exhaust line 34, the supply pressure is applied to bladder 18 (through orifice 32) to inflate the bladder and thus close off the outlet slot 12 of duct 10. The pressure at the velocity sensor 28 is essentially atmospheric pressure under these conditions. A typical supply pressure at fitting 26 is approximately 1" W.G., while a typical pressure on the closed or bottom side of diaphragm 40 is approximately 0.1" W.G. Consequently, the pressure differential across orifice 46 is considerably greater than the differential across orifice 58, and the constriction provided by orifice 58 permits the pressure to build up below diaphragm 40 to the extent necessary to effect closing of the control orifice 36. The result is that bladder 18 is maintained in a fully inflated condition to close off slot 12 when there is no demand for cool air.

If the temperature in the room rises above the setting of thermostat 54, the thermostat opens to bleed off the pressure below diaphragm 40 through orifice 48 and the thermostat orifice 52. The constriction provided by the small (0.007") orifice 46 permits the pressure below diaphragm 40 to approach atmospheric pressure, and the weight of the diaphragm causes it to move downwardly to open orifice 36. Pressure is then bled from bladder 18 through the exhaust line 34 and through orifice 36 and the vent opening 42. This effects deflation of bladder 18 and opens slot 12 to permit conditioned air to flow into the room. As the flow through the duct outlet increases, the pressure increases at the velocity sensor 28, and, if the flow becomes high enough, the pressure at the velocity sensor builds up to the level necessary to close diaphragm 40. The velocity sensor pressure is applied through orifice 58 to the underside of the diaphragm, and eventually an equilibrium or balance point is reached where a relatively constant flow of conditioned air is directed into the room. An excessively high rate of air flow into the room is precluded due to the action of the velocity sensor.

When thermostat 54 is partially open, the pressure below diaphragm 40 is maintained by a combination of the supply pressure, as transmitted through conduits 30 and 44, and the velocity sensor pressure, as transmitted through conduit 56. If the flow through opening 12 is low, the pressure at the velocity sensor is relatively low and there is not enough pressure applied to the underside of the diaphragm to maintain it closed. Consequently, the control orifice 36 is open and air is bled from bladder 18, thereby increasing the air flow through slot 12. Conversely, if the air flow is relatively high, the flow at the velocity sensor increases the pressure below the diaphragm to effect closing of the control orifice 36. The bladder pressure then increases, and the air flow eventually reaches its balance point.

It is thus apparent that the control function of the pneumatic circuit is nearly independent of the main supply pressure in duct 10. For a given position of the thermostat, the flow of conditioned air is determined primarily by the pressure that is fed back to relay 38 from the velocity sensor. The feedback signals from the velocity sensor automatically compensate for variations in the main supply pressure to provide a pressure independent control circuit. The amplifying relay 38 provides both flow gain and pressure gain so that a small orifice thermostat controls a relatively high flow into and out of the bladder 18, thus providing a quick response to changes in the demand for conditioned air. A number of different units operating at radically different supply pressures can be controlled from a single thermostat without significant adverse effects, because all of the control pressures and signals are referenced to a single common pressure (atmospheric pressure). The velocity signals from all of the units are independent of supply pressure since the velocity signals depend only on the flow through the respective diffusers.

Rather than adding a high velocity pressure or pressure differential on the high pressure side of the bladder, the pneumatic circuit utilizes the pressure drop across the diffuser downstream of the actuator bag for control purposes. This pressure differential is necessary for good air distribution in the occupied space, so it is not necessary to add any pressure at all for control purposes. Consequently, the number of pressure sensitive components is minimized and the fan energy is not used for purposes of control. Since only a single diaphragm 40 is necessary in order to achieve pressure independent control, the pneumatic circuit is reduced in cost and complexity as compared to control systems which require a number of diaphragms and similar pressure sensitive elements. It is to be understood that the pneumatic control circuit functions equally well to control the distribution of heated air.

The typical supply pressure is of order 1.0" W.G. The typical pressure on closed (bottom) side of the diaphragm is 0.1" W.G. The pressure on the upper side of the diaphragm is approximately atmospheric, except in the small area inside the perimeter of the control orifice. The weight of the diaphragm (or a spring) tends to hold the orifice open.

Assuming no flow and zero pressure at the velocity sensor, the thermostat in parallel with orifice 58 establish the pressure below the diaphragm. When the thermostat is closed, the orifice 58 constriction forces the pressure below the diaphragm is high enough to hold the control orifice closed and keep the bag pressure high (at supply pressure).

When the thermostat opens, the pressure below the diaphragm decreases toward atmospheric, because of orifice 48. This allows the diaphragm weight to open the control orifice and bleed air from the actuator bag. As the flow builds up, pressure builds up at the velocity sensor toward the pressure required to close the diaphragm. Orifice 46 allows this pressure to develop.

When the thermostat is partially open, the pressure below the diaphragm is maintained by a combination of flow through orifice 48 and through the velocity sensor. When there is no flow, the relative low pressure below the diaphragm opens the control orifice, bleeds air from the bag and allows the flow to increase. When the air flow is very high the flow from the velocity sensor increases the pressure below the diaphragm, closes the control orifice and allows the bag pressure to increase until the air flow reaches its balance point. The result is a pressure-independent control. For a given thermostat opening, the air flow is fixed by the pressure fed back from the velocity sensor. Variation in the main supply pressure are automatically compensated for by the feedback from the velocity sensor.

Because the velocity signal is applied to the same volume of space below the diaphragm as the thermostat signal, the velocity signal from one device can be applied to the thermostat part of a separate control on a separate device to make the second separate device act in concert with the first device, but in the opposite direction. This is useful when there are to be separate heating and cooling devices serving a common space. It is desirable to interlock the two devices so that as the cooling increases, the heating decreases, and vice versa. For example, when the thermostat circuit on a control for a heating device is connected to the velocity conduit on an associated cooling device, an increase in the cooling air flow will force a corresponding decrease in the heating air flow. Only one thermostat is used—to control the cooling air flow—and the heating air flow changes inversely with it.

Features of this control system are:

(1) Only one diaphragm is required to achieve pressure-independent control. The main control device is inexpensive.

(2) It is not necessary to provide a high velocity pressure or pressure differential on the high pressure side of the actuator bag. The pressure drop across the diffuser downstream of the actuator bag is adequate. This pressure differential is necessary for good air distribution in the occupied space, so it is not necessary to add any pressure for control purposes.

(3) The relay device provides both flow gain and pressure gain. This enables one to use a small orifice remote thermostat to control a relatively high flow into or out of the actuator bag, thus providing fast response. It also makes it feasible to control many different units from a single thermostat. These different units can have radially different supply pressures, without adverse effect, because all of the control pressures and signals are referenced to a single common pressure—atmospheric pressure. The velocity signals from all units are independent of supply pressure for those units; they depend only on the flow through the respective diffusers.

(4) By connecting the velocity signal for one control on one air system to the thermostat part for a separate control on a separate air system, one can enable a single thermostat to control the two air systems together such that the flow in the second air system varies inversely with the flow in the first air system.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations.

This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. In an air distribution system for applying conditioned air to an area, the combination of:
   a duct adapted to receive conditioned air at a relatively high supply pressure, said duct having an outlet for discharging conditioned air at a relatively low pressure to said area;
   pressure responsive actuator means for controlling the flow of conditioned air through said outlet, said actuator means being in communication with a pressure source and acting in response to the pressure therefrom in a manner to reduce the flow through said outlet;
   an exhaust line communicating with said actuator means for bleeding pressure therefrom to increase the flow through said outlet, said exhaust line having a control orifice therein;
   a diaphragm for opening and closing said control orifice to control the condition of said actuator means, said diaphragm having one side adjacent said control orifice and an opposite side communicating with said supply pressure;
   a velocity sensor for sensing the flow through said outlet, said sensor communicating with said opposite side of the diaphragm to urge same toward the control orifice in cooperation with the supply pressure; and
   temperature responsive thermostat means for bleeding pressure from said opposite side of the diaphragm at a preselected temperature in said area, thereby opening said control orifice to bleed pressure from said actuator means for increased flow of conditioned air through said outlet.

2. In combination with an air distribution system having a duct for receiving conditioned air at a relatively high supply pressure, an outlet in the duct for discharging the conditioned air therefrom at a relatively low pressure, and an inflatable bladder for controlling the flow through the outlet, a pneumatic control circuit comprising:
   a source of pressurized air applying pressure to the bladder for inflation of same to decrease the flow of conditioned air through the outlet;
   an exhaust line communicating with the bladder for bleeding pressure therefrom to increase the flow of conditioned air through the outlet;
   a control orifice in said exhaust line for controlling the bleeding of pressure from the bladder;
   a diaphragm having one side adjacent said control orifice and an opposite side adapted to receive pressure to force said one side against said control orifice for closing of same to maintain the bladder pressure;
   a first conduit communicating with said source and with said opposite side of the diaphragm to apply pressure thereto, said first conduit having an orifice therein;
   a velocity sensor for sensing the flow of conditioned air through said outlet;
   a second conduit communicating with said velocity sensor and with said opposite side of the diaphragm to apply the velocity sensor pressure thereto, said second conduit having an orifice therein; and
   temperature sensitive thermostat means communicating with said opposite side of the diaphragm, said thermostat means acting to relieve the pressure on said opposite side of the diaphragm at a preselected level of the sensed temperature.

3. A pneumatic control circuit as set forth in claim 2, including a third conduit providing communication between said source and said bladder.

4. A pneumatic control circuit as set forth in claim 3, including an orifice in said third conduit.

5. A pneumatic control circuit as set forth in claim 3, wherein said exhaust line connects with said third conduit.

6. A pneumatic control circuit as set forth in claim 5, including an orifice in said third conduit upstream of the exhaust line.

7. A pneumatic control circuit as set forth in claim 4, wherein said orifice in the first conduit presents a smaller effective flow area than said orifice in said third conduit.

8. A pneumatic control circuit as set forth in claim 7, wherein the orifice in said second conduit presents a larger effective flow area than said orifice in said first conduit.

9. A pneumatic control circuit as set forth in claim 8, wherein the orifice in said second conduit presents a smaller effective flow area than said orifice in said third conduit.

10. An air distribution system for applying conditioned air to an area, said system comprising:
    a supply duct adapted to receive conditioned air at a relatively high supply pressure, said duct having an outlet for discharging the conditioned air to said area at a relatively low pressure;
    a pressure responsive actuator for controlling the flow through said outlet, said actuator being in fluid communication with said supply pressure therefrom to reduce the flow through said outlet;
    an exhaust line communicating with said actuator to bleed pressure therefrom to increase the flow through said outlet;
    a control orifice in said exhaust line for controlling the passage of air therethrough;
    a diaphragm having one side adjacent said control orifice for closing of same and an opposite side communicating with said supply duct to urge said one side toward the control orifice;
    a flow sensor for sensing the flow through said outlet, said sensor communicating with said opposite side of the diaphragm to urge same toward the control orifice in response to increasing flow through the outlet; and
    temperature responsive thermostat means for bleeding pressure from said opposite side of the diaphragm at a preselected temperature in said area, thereby opening the control orifice to bleed pressure from said actuator for increased flow of conditioned air through said outlet.

11. In an air distribution system having a duct for receiving conditioned air at a relatively high supply pressure, an outlet in the duct for discharging the conditioned air therefrom at a relatively low pressure, and a pressure responsive actuator for controlling the flow through said outlet, the improvement comprising:
    a first conduit providing communication between said duct and actuator to apply the supply pressure to said actuator, thereby reducing the flow through said outlet, said first conduit having an orifice therein;

an exhaust line communicating with said actuator for bleeding pressure therefrom to increase the flow of air through said outlet, said exhaust line having a control orifice for controlling the bleeding of pressure from the actuator;

a diaphragm having one side adjacent the control orifice and an opposite side adapted to receive pressure to urge said one side toward the control orifice for closing of same;

a second conduit providing communication between said duct and said opposite side of the diaphragm, said second conduit having an orifice therein;

a flow sensor for sensing the flow of conditioned air through said outlet;

a third conduit providing communication between said flow sensor and said opposite side of the diaphragm, said third conduit having an orifice therein; and thermostat means for relieving the pressure on said opposite side of the diaphragm to open the control orifice at a preselected temperature.

* * * * *